(12) United States Patent
Bellman et al.

(10) Patent No.: US 8,683,994 B2
(45) Date of Patent: Apr. 1, 2014

(54) SOLAR HEAT COLLECTION ELEMENT WITH GLASS-CERAMIC CENTRAL TUBE

(75) Inventors: Robert Alan Bellman, Painted Post, NY (US); William Joseph Bouton, Addison, NY (US); Douglas Warren Hall, Corning, NY (US); Karen Irene Matthews, Horseheads, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 757 days.

(21) Appl. No.: 12/867,805

(22) PCT Filed: Feb. 17, 2009

(86) PCT No.: PCT/US2009/000988
§ 371 (c)(1),
(2), (4) Date: Aug. 16, 2010

(87) PCT Pub. No.: WO2009/105190
PCT Pub. Date: Aug. 27, 2009

(65) Prior Publication Data
US 2010/0313877 A1    Dec. 16, 2010

Related U.S. Application Data

(60) Provisional application No. 61/066,375, filed on Feb. 20, 2008.

(51) Int. Cl.
*F24J 2/24* (2006.01)
(52) U.S. Cl.
USPC ............... 126/653; 126/651; 126/652

(58) Field of Classification Search
CPC ........................................... F24J 2/055
USPC ........................... 126/651, 652, 653
See application file for complete search history.

(56) References Cited

U.S. PATENT DOCUMENTS

| | | | |
|---|---|---|---|
| 579,107 A | 3/1897 | Estabrook | |
| 4,011,093 A * | 3/1977 | Veres | ............... 501/64 |
| 4,011,858 A | 3/1977 | Hurkett | |

(Continued)

FOREIGN PATENT DOCUMENTS

| | | |
|---|---|---|
| DE | 198 21 137 | 11/1999 |
| DE | 10036746 | 1/2002 |
| DE | 20 2005 014 826 | 4/2006 |
| GB | 2 032 095 | 4/1980 |

OTHER PUBLICATIONS

Lanxner et al.; "Solar selective absorber coating for high service temperatures, produced by plasma sputtering"; SPIE vol. 1272 Optical Materials Technology for Energy Efficiency and Solar Energy Conversion IX (1990); pp. 240-249.

(Continued)

*Primary Examiner* — Kang Hu
*Assistant Examiner* — John C Hailey, III
(74) *Attorney, Agent, or Firm* — Joseph M. Homa; Michael A. Hood (57) ABSTRACT

A solar heat collection element includes: a central tube (102) formed from glass-ceramic material; and an outer tube (104) formed from glass material disposed coaxially with respect to the central tube (102) to form a volume therebetween (106).

17 Claims, 5 Drawing Sheets

(56) References Cited

U.S. PATENT DOCUMENTS

| | | | |
|---|---|---|---|
| 4,066,120 A * | 1/1978 | Mold et al. ............... | 165/165 |
| 4,080,954 A | 3/1978 | de Wilde et al. | |
| 4,153,042 A | 5/1979 | Tragert | |
| 4,156,420 A * | 5/1979 | Gunderson ............... | 126/655 |
| 4,186,724 A | 2/1980 | Nelson | |
| 4,186,725 A | 2/1980 | Schwartz | |
| 4,222,373 A * | 9/1980 | Davis ....................... | 126/664 |
| 4,233,957 A | 11/1980 | Kenny | |
| 4,257,402 A * | 3/1981 | Westerman, II .......... | 126/652 |
| 4,326,503 A | 4/1982 | Geier et al. | |
| 4,364,373 A * | 12/1982 | Takeuchi et al. .......... | 126/570 |
| 4,409,964 A * | 10/1983 | Shimada et al. .......... | 126/652 |
| 4,413,618 A * | 11/1983 | Pitts et al. ................ | 126/684 |
| 4,421,102 A * | 12/1983 | Posnansky et al. ....... | 126/647 |
| 4,519,381 A * | 5/1985 | Tremblay .................. | 126/579 |
| 4,553,530 A * | 11/1985 | Mizukami et al. ........ | 126/598 |
| 4,554,908 A * | 11/1985 | Hanlet et al. ............. | 126/652 |
| 4,579,107 A * | 4/1986 | Deakin ..................... | 126/654 |
| 4,598,696 A | 7/1986 | Clegg | |
| 4,628,905 A | 12/1986 | Mills | |
| 4,812,344 A * | 3/1989 | Jaeger et al. ............. | 428/34.6 |
| 4,827,905 A * | 5/1989 | Takeuchi et al. .......... | 126/652 |
| 4,834,066 A | 5/1989 | Collins et al. | |
| 4,987,883 A | 1/1991 | Watkins et al. | |
| 5,523,132 A * | 6/1996 | Zhang et al. ............. | 428/34.4 |
| 6,107,116 A | 8/2000 | Kariya et al. | |
| 6,349,718 B1 * | 2/2002 | Ven et al. ................. | 126/685 |
| 6,540,379 B2 * | 4/2003 | Ooms et al. .............. | 362/263 |
| 6,698,242 B1 * | 3/2004 | Beier et al. ............... | 65/43 |
| 6,705,311 B1 | 3/2004 | Schwartzman et al. | |
| 6,832,608 B2 | 12/2004 | Barkai et al. | |
| 7,013,887 B2 | 3/2006 | Kuckelkorn et al. | |
| 7,235,736 B1 * | 6/2007 | Buller et al. .............. | 136/251 |
| 7,240,675 B2 | 7/2007 | Eickhoff | |
| 8,353,286 B2 * | 1/2013 | Li ............................. | 126/640 |
| 2004/0134484 A1 | 7/2004 | Barkai et al. | |
| 2007/0209658 A1 * | 9/2007 | Riffelmann et al. ...... | 126/684 |
| 2007/0235023 A1 * | 10/2007 | Kuckelkorn et al. ..... | 126/652 |
| 2007/0235024 A1 | 10/2007 | Kuckelkorn et al. | |
| 2007/0270299 A1 * | 11/2007 | Rosenflanz et al. ...... | 501/10 |
| 2009/0117299 A1 | 5/2009 | Mientkewitz et al. | |

OTHER PUBLICATIONS

Kennedy; Review of Mid- to High-Temperature Solar Selective Absorber Materials; NREL/TP-520-31267; Jul. 2002.

Sargent & Lundy LLC Consulting Group; "Assessment of Parabolic Trough and Power Tower Solar Technology Cost and Performance Forecasts"; NREL/SR-550-34440; Oct. 2003.

Tucker; "Dynamic Fatigue of a Lithia-Alumina-Silica Glass-Ceramic"; J. Am. Ceram. Soc., vol. 73, No. 8; 1990; pp. 2528-2530.

Choi et al.; "Results of Mechanical Testing for Pyroceram Glass-Ceramic"; NASA/TM-2003-212487.

Forristall; "Heat Transfer Analysis and Modeling of a Parabolic Trough Solar Receiver Implemented in Engineering Equation Solver"; NREL/TP-550-34169; Oct. 2003.

San Marchi et al.; "Technical Reference on Hydrogen Compatibility of Materials, Austenitic Stainless Steels: Type 316 (code 2103)"; Sandia National Laboratories, May 2005.

Kearney; "Parabolic Trough Collector Overview, notes on a bit of history, development after Luz, and a recent surge in trough collector technology offerings"; NREL, Parabolic Trough Workshop 2007.

Kennedy et al.; "Progress in Development of High-temperature Solar-Selective Coating"; NREL/CP-520-36997.

NREL; "Parabolic Trough Receiver Thermal Performance"; Parabolic Trough Workshop, Golden, Co.; Mar. 2007.

* cited by examiner

SOLAR HEAT COLLECTION ELEMENT WITH GLASS-CERAMIC CENTRAL TUBE

CROSS-REFERENCE TO RELATED APPLICATIONS

This application claims the benefit of priority to U.S. application No. 61/066,375, filed on Feb. 20, 2008, which is incorporated by reference herein.

BACKGROUND OF THE INVENTION

The present invention relates to a solar heat collection element (HCE), which is a tubular radiation absorbing device for solar thermal applications.

Figure 1:
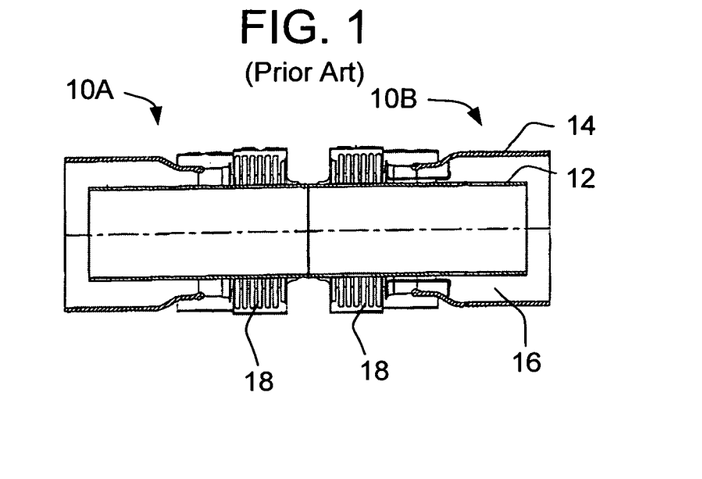
FIG. 1 is a side view of a pair of heat collection elements coupled together through a bellows arrangement in accordance with the prior art.

HCEs may be employed in, among other applications, a parabolic trough-collector for a solar power plant. With reference to FIG. 1, the conventional heat collection structure comprises a plurality of HCEs 10, a pair 10A, 10B of which are shown coupled together. Each HCE 10 includes a central tube 12 and a glass tubular jacket (outer tube) 14 surrounding the central tube 12 so as to form a cylindrical space (with a ring-shaped cross section) 16 therebetween. Solar radiation is concentrated via a parabolic tracking mirror (not shown) and focused on the HCE 10 and converted into heat. The conventional HCE 10 is about four meters long, and the overall length of the heat collection structure is based on the number of HCEs coupled together. The collected heat is conducted away via a heat-carrying medium flowing through the central tube 12 of the HCE 10 and is used directly as process heat or converted into electrical energy.

The central (or inner) tube 12 is typically stainless steel and coated with an interference coating designed to: (1) absorb solar radiation, (2) act as an infrared mirror, and (3) have low emissivity at a maximum temperature of operation. The outer tube 14 is typically formed from a borosilicate glass. The inner steel tube 12 and the outer glass tube 14 are connected using bellows 18 to compensate for the thermal expansion mismatch between glass and steel. The outer glass tube 14 is bonded to the bellows 18 using glass-to-metal sealing techniques and the bellows 18 is welded to the steel tube 12. The bellows 18 provides a glass-metal transitional element, which permits longitudinal movement between the steel and glass tubes 12, 14 to compensate for the thermal expansion mismatch therebetween.

The space between the glass tube 14 and the steel tube 12 is evacuated to about $10^{-4}$ Torr to minimize radiating heat losses. Conventional HCE design employs organic heat transfer fluid (HTF) through the steel tube 12. Typical HTFs include Therminol™ VP-1 or Dowtherm A, each a mixture of about 75% diphenyl oxide and 25% biphenyl.

The operating temperature range of the conventional HCE 10 that uses synthetic oil as the HTF is between about 300-400° C. (750° F. maximum) for solar power generation. At the maximum operating temperature of 400° C., the glass tube 14 heats up to about 100° C. To meet quality control and reliability requirements for tubes using synthetic oil as the HTF, the HCEs must be capable of cycling from below 0° C. to 400° C. for a period of 25-30 years.

Free hydrogen generated by age degradation of the synthetic oil HTF diffuses through the steel tube 12 and compromises the vacuum within the cylindrical space 16. The permeation rate and the oil degradation rate increase with increasing operating temperature. Hydrogen gas has very high thermal conductivity so there is a significant heat loss associated with leakage of hydrogen into the space 16 and resultant reduction of vacuum.

The use of supersaturated steam and molten salts as HTFs are being considered to mitigate the hydrogen diffusion problem. The concern with using supersaturated steam as an HTF is that the weight of the steel tube 12 would need to increase due to the higher pressures required—compared with the pressures used with synthetic oil. Further, a design using supersaturated steam must also deal with flash steam, condensation, safety precautions (i.e., tube breakage in the field), etc. The major concerns with the use of molten salts as the HTF are freezing (or salt solidification) and corrosion.

Thus, conventional coating techniques have been developed to address the hydrogen diffusion issue. For example, native thermal oxide on stainless steel tubes and aluminum oxide are used to mitigate the hydrogen permeation problem. In addition to addressing the hydrogen diffusion issue, the conventional steel central tube 12 typically includes a number of coatings on the outside surface thereof to achieve several functions, namely: (i) to promote the absorption of sun radiation; (ii) to promote reflection of sun radiation in the infrared spectrum; (iii) to promote low emissivity; and (iv) to act as a hydrogen barrier. For example, a typical coating configuration includes (from innermost to outermost layer): a hydrogen barrier of $Al_2O_3$ of about 25 nm thickness deposited on a native oxide; an infrared mirror of Mo of about 150 nm; a visible absorption layer of cermet (ceramic metal, Mo—$Al_2O_3$) of about 70-100 nm; and an anti-reflective layer of $SiO_2$ or $Al_2O_3$ of about ¼ wavelength thickness.

In addition to coating the steel tube 12, getter material is introduced into the space 16 to remove hydrogen. Getter material, which combines or reacts with the hydrogen gas, assists in maintaining the vacuum. When the capacity of the getter material is saturated, the pressure again rises in the space 16 until the partial pressure of the free hydrogen in the space 16 reaches equilibrium with the hydrogen dissolved in the HTF. The equilibration pressure of the hydrogen in the space 16 amounts to between 0.3 mbar and 3 mbar in known absorber tubes.

There are a number of problems with the conventional HCE design, including: the relatively high complexity (and associated parts and assembly cost) of the bellows mechanism, heat loss through the bellows mechanism (which may be as high as 10%), the aforementioned thermal expansion mismatches and associated temperature instabilities, the hydrogen permeability problems discussed above, corrosion problems when molten salt HTFs are employed, complex and costly coating techniques, relatively high weight, etc.

Thus, there are needs in the art for new HCE mechanisms that reduce or eliminate one or more of the above problems.

SUMMARY OF THE INVENTION

In accordance with one or more embodiments of the present invention, a solar heat collection element includes: a central tube formed from glass-ceramic material; and an outer tube formed from glass material disposed coaxially with respect to the central tube to form a volume therebetween. Respective ends of the outer tube are coupled to the central tube.

The respective ends of the outer tube may be coupled to the central tube without employing flexible joints such as metal bellows. Additionally or alternatively, the respective ends of the outer tube may be directly fused to the central tube.

The operating temperature range limits of the outer tube may be lower than operating temperature range limits of the central tube. The respective coefficients of thermal expansion (CTEs) of the outer tube and the central tube may be selected such that respective longitudinal expansions of the outer tube and the central tube substantially match one another (i.e., such that the bond or fusion between the outer tube and the central tube does not exhibit early failure under thermal cycling). For example, the CTE of the outer tube may be between about 2 to 6 times less than the CTE of the central tube.

Because of the thermal expansion differences and the lower operating temperature limits of the outer tube, mitigating stresses arising at the joint of the glass-to-ceramic seal may require either a glass ring (formed of a glass of intermediate expansion and operating temperature) or a graded seal between the inner and outer tubes.

The solar heat collection element may further include getter material disposed in the area between the outer tube and the central tube. The getter material may be between 1 and 40 grams, such as less than 40 grams, less than 20 grams, less than 5 grams, and/or about 1 gram.

The central tube may be at least partially transparent and include a solar energy absorbing coating on an inside surface thereof. An infrared mirror coating may be disposed on an outside surface of the central tube. An anti-reflective coating may be disposed on the infrared mirror coating.

Alternatively, the central tube may be of a dark opaque pigment. In such case, the central tube need not include a solar energy absorbing coating on an outside surface thereof. An infrared mirror coating may be disposed on an outside surface of the central tube. An anti-reflective coating may be disposed on the infrared mirror coating.

Alternatively, the central tube may be made of a light opaque pigment. An infrared mirror coating may be disposed on an outside surface of the central tube. A solar energy absorbing coating may be disposed on the infrared mirror coating. An anti-reflective coating may be disposed on the solar energy absorbing coating.

A wall thickness of the central tube depends on the operating pressure of HTF, and may be 5 mm of less, such as less than 4 mm thick, such as between about 3-3.5 mm thick.

Other aspects, features, and advantages of the present invention will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the invention is not limited to the precise arrangements and instrumentalities shown.

DETAILED DESCRIPTION OF THE PREFERRED EMBODIMENTS

Figure 2:
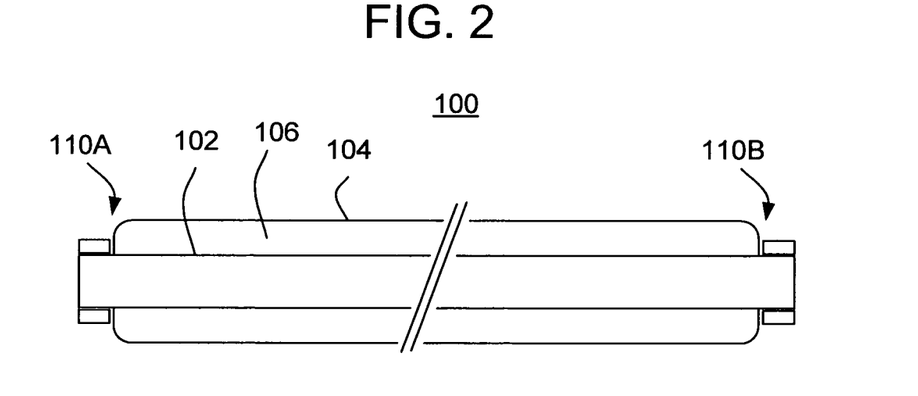
FIG. 2 is a side view of a heat collection element employing a glass-ceramic central tube in accordance with one or more aspects of the present invention.

With reference to the drawings, wherein like numerals indicate like elements, there is shown in FIG. 2 a solar heat collection element (HCE) 100, which includes a central tube 102 formed from glass-ceramic material, and an outer tube 104 formed from glass material. The outer tube 104 is disposed coaxially with respect to the central tube 102 to form a volume 106 therebetween. The configuration of the central tube 102 and the outer tube 104 are preferably cylindrical, thereby yielding a cylindrical shaped space 106 (with a ring-shaped cross section).

Among the differences between the HCE 100 of the present invention and the HCEs of the prior art is the use of the central tube 102 formed from glass-ceramic material, as opposed to stainless steel. The outer tube 104 may be formed from a suitable glass, such as a borosilicate glass available from Corning Incorporated. Advantages of such a structure include: lower parts count and simplified assembly; greatly reduced hydrogen permeability; reduced number of getters (or elimination thereof); corrosion resistance for molten salt heat transfer fluid (HTF) applications; lower weight; improved thermal stability (e.g., minimized bending when operating at high temperature); simplified coating configurations; and reduced heat loss. These advantages will be discussed and/or become clarified in view of the discussion below.

Before discussing further details of the embodiments of the invention, some basic structural and operational characteristics of the HCE 100 will be reviewed. The space 106 between the outer tube 104 and the central tube 102 is evacuated to about $10^{-4}$ Torr to minimize radiating heat losses. A heat transfer fluid (HTF) flows through the central tube 102 to conduct the collected heat for further use. The HTFs may be selected from oil, such as Therminol™ VP-1, steam, molten salt, etc. The operating temperature range of the inner tube 102 is between about 300-520° C., depending on the HTF, and the operating temperature of the outer tube 104 may be 100° C.

Notably, the respective end connections 110A, 110B of the outer tube 104 to the central tube 102, of the HCE 100 are constructed such that respective ends of the outer tube 104 are directly or indirectly connected to the central tube 102. In the case of a direct fusing of the outer tube 104 to the central tube 102, the respective materials are elevated in temperature to achieve fusion of the molten materials together. The connection mechanism, whether direct or indirect, advantageously may avoid the use of temperature expansion compensation mechanisms, such as the bellows 18 of the prior art configurations. This lowers the parts count and simplifies the assembly process.

The elimination of the temperature expansion compensation mechanisms elevates the importance of the design considerations associated with the coefficients of thermal expansion (CTEs) of the outer tube 104 and the central tube 102. The conventional thinking in the context of fusing materials (such as glass and/or glass-ceramic) is to ensure that the CTEs match. Matching CTEs in the context of manufacturing the HCE 100 may not be acceptable, however, as the outer tube 104 and the central tube 102 heat to different temperatures in operation. The operating temperature range limits of the outer tube 104 are lower than operating temperature range limits of the central tube 102. Depending on the specific design of the HCE 100, the operating temperature range of the outer tube 104 may be from below 0° C. to about 100° C. The operating temperature range of the central tube 102 depends on the specific HTF in use (e.g., Therminol™ VP-1, steam, molten salt, etc.)—and can range from below about 0° C. to about 520° C. (for molten salt as the HTF). The glass-to-ceramic joint may require a graded seal or a ring of glass (of intermediate expansion and operating temperature) if the operating temperature limits at the joint are either higher than the operating temperature limits of the outer tube 104, or sufficient to cause objectionable stress in the joint.

The desirable combination of respective CTEs for the outer tube 104 and the central tube 102 allows for substantially the same dimensional change for both tubes within their operating temperature limits. In accordance with one or more aspects of the present invention, respective coefficients of thermal expansion (CTEs) of the outer tube 104 and the central tube 102 are selected such that respective longitudinal expansions of the outer tube 104 and the central tube 102 substantially match one another. The CTE of the outer tube 104, therefore, may be between about two to six times less than the CTE of the central tube 102, such as about five times less. Thus, if for example the outer tube 104 operates over a 100 degree temperature range and the central tube 102 operates over a 500 degree temperature range, then the CTE of the central tube 102 should be about five times less than the CTE of the outer tube 104. If the outer tube were made of Pyrex® with a CTE of 3.3 ppm/° C., then the central tube 102 should be formed from a glass ceramic with a CTE of about 0.66 ppm/° C. The CTE of various glass ceramic materials, such as Corning's Pyroceram® and/or Schott's Robax® can be tailored to be very low or even negative in order to meet the CTE design objectives of the HCE 100. For instance, the CTE of the central tube may be less than about 4 ppm/° C.

The length of the HCE 100 may be of any practical magnitude, with a length of about four meters being suitable. The overall length of the heat collection structure is based on the number of HCEs 100 coupled together. About three HCEs 100, each of about 4 meters long may be directly welded together to form one, twelve meter long section. This may be accomplished without the need for a flexible hose joint. Therefore, one of the advantages of employing a glass ceramic central tube 102 is that much longer sections may be formed, for example, connecting about six to nine HCEs 100 together before there is a need for a flexible hose joint. Contrast this with prior art designs employing a steel central tube, where a twelve meter long section needs to be connected to a next twelve meter long section using costly flexible hose joints. This is because the twelve meter assembly (of steel tube construction) thermally expands by over three inches over the operating temperature range of the respective HCEs. The glass ceramic central tube 102 may have a CTE that is more than ten times lower than the CTE of the steel tube.

Figure 3:
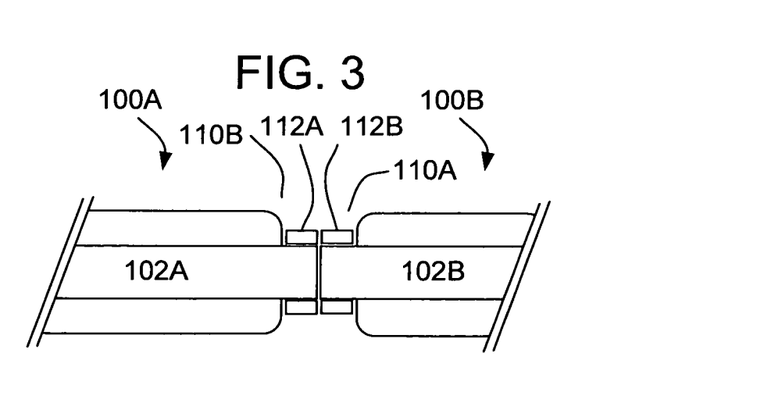
FIG. 3 is a side view of a pair of heat collection elements coupled together without a bellows arrangement in accordance with one or more further aspects of the present invention.

As illustrated in FIG. 3, an end 110B of one HCE 100A is coupled to an end 110A of another HCE 100B. This may be accomplished using metal collars 112A, 112B bonded to the central tubes 102 of the respective HCEs 100A, 100B. The metal collars 112A, 112B may be formed from any suitable material, such as low carbon austenitic steel. The bonding of the metal collars 112A, 112B to the glass-ceramic material of the central tube 102 can be accomplished using known methods, such as discussed in Donald, I. W. "Preparation, properties and chemistry of glass- and glass-ceramic-to-metal seals and coatings," Journal of Materials Science, Vol. 28, pp. 2841-2886 (1993). During assembly in the field, the HCEs 100A, 100B may be coupled to one another by welding the metal collars 112A, 112B together.

Solar radiation may be concentrated and focused on the plurality of HCEs 100 via a parabolic tracking mirror (not shown) and converted into heat. Suitable parabolic tracking mirror technologies are well understood in this art. The collected heat is conducted away via a heat-carrying medium HTF flowing through the central tubes 102 of the HCEs 100 and may be used directly as process heat or converted into electrical energy.

Further details of the embodiments of the invention will now be discussed. The design of the central tube 102 for CSP plants is based, in part, on: ASME B31.1 Code for power piping (which defines dimensional and materials requirements for the central tube 102); the optical design of troughs for maximum efficiency and tolerances with respect to the focal line of parabolic mirrors; and material choice, which is determined by: (i) the compatibility of the central tube 102 and the HTF; (ii) the minimization of hydrogen permeation through the central tube 102; and (iii) the need to weld respective HCEs 100 together the field without annealing.

In general the wall thickness of the central tube 102 is established by the pressure carrying and beam bending characteristics of the material. The ASME B31.1 Code uses the following equation to calculate the maximum working pressure of a tube:

$$t = \frac{P \cdot D}{2 \cdot S + 2 \cdot yP}$$

where t is the minimum required wall thickness, P is the maximum allowable working pressure, D is the outside diameter, S is the allowable stress value at the design temperature of the material metal, and y is a temperature dependant parameter varying between 0.4 and 0.7. For high temperatures y=0.4 should be used.

In prior art designs, the material of the central tube is steel, and with maximum operating temperature of 400° C. at 600 psi, the steel tube 12 must have an allowable stress of at least 10,000 psi (or yield strength of 15,000 psi at 400° C.). In accordance with prior art designs, the following dimensional parameters have been accepted: OD=70 mm, wall thickness=2 mm (for an HTF of Therminol™ VP-1), length=4060 mm, and maximum allowable working pressure=600 psi (at 400° C.). The material specification is based on the A-249 standard for welded tubing. The above parameters are obtained as discussed below.

The ASME codes publish allowable stresses for the various types of steel as function of temperature. According to ASME B31.1, the allowable metal stress of the central tube 12 of the prior art in the time independent range can also be calculated by choosing lowest of: (1) the minimum yield strength at the operating temperature divided by 1.5; (2) the minimum tensile strength divided by 3.5; (3) the tensile strength at operating temperature multiplied by 1.1 and then divided by 3.5; and (4) the minimum yield strength at room temperature divided by 1.5.

Figure 4:
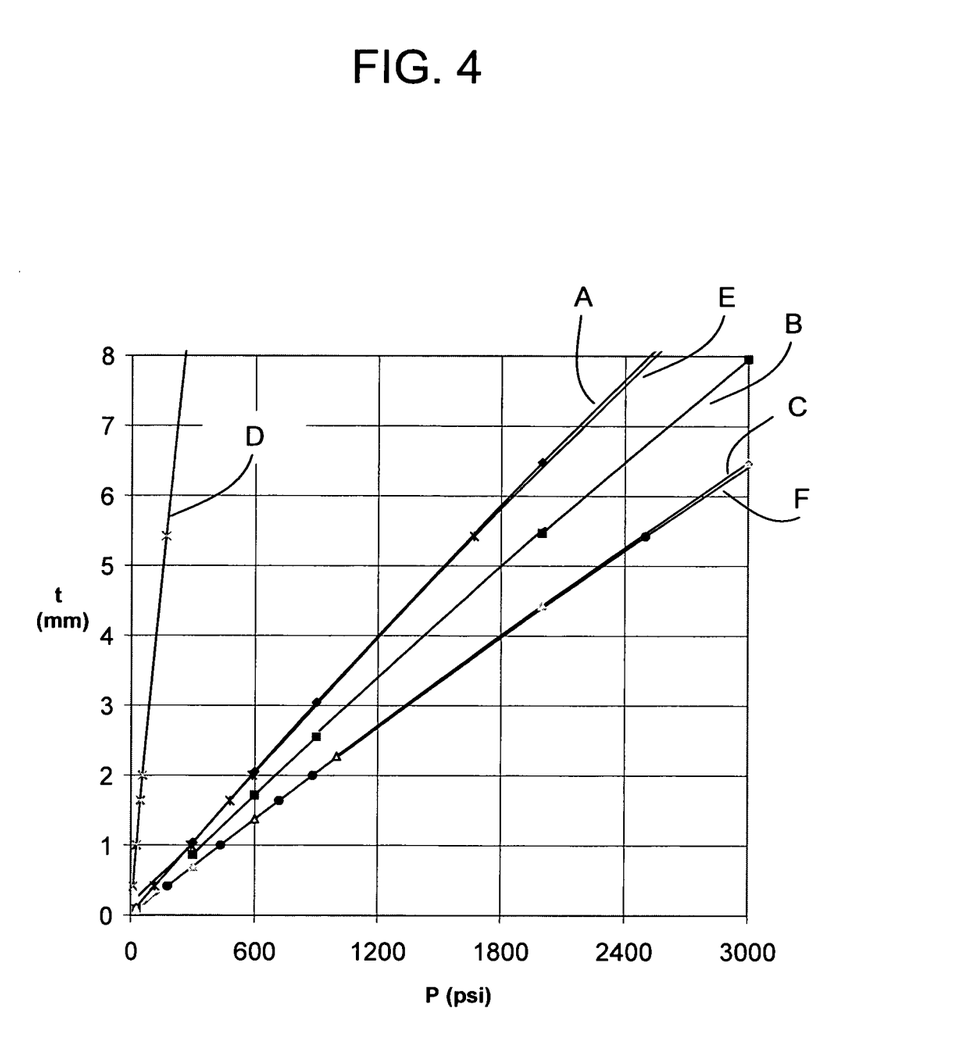
FIG. 4 is a graph showing the required wall thickness of a 70 mm OD steel central tube plotted as a function of pressure.

With reference to FIG. 4, the wall thickness of steel tubes 12 can also be calculated using hoop stress to get similar results as the ASME B31.1 equation above. In FIG. 4 the required wall thickness of a 70 mm OD steel tube is plotted as a function of pressure, where allowable stresses (S) are calculated using both the ASME B31.1 burst pressure equation, and the hoop stress equation. Curve A corresponds to ASME B31.1 for y=0.4 and S=10,000 psi; curve B corresponds to ASME B31.1 for y=0.4 and S=12,000 psi; curve C corresponds to ASME B31.1 for y=0.4 and S=15,000 psi; curve D corresponds to the hoop stress for S=1,000 psi; curve E corresponds to the hoop stress for S=10,000 psi; and curve F corresponds to the hoop stress for S=15,000 psi.

The temperature and pressure values are dependent on the HTF. For Therminol™ VP-1, the operating temperature is 400° C., the maximum working pressure is 600 psi, and the wall thickness for a 70 mm steel tube at S=10,000-12,000 psi is 2 mm. For steam, the operating temperature is 480-500° C., the maximum working pressure is 900-3000 psi, and the wall thickness for a 70 mm steel tube at S=10,000 psi is 3-10 mm, and at S=12,000 psi is 2.5-8 mm. For molten salt, the operating temperature is 500-520° C., the maximum working pressure is 150 psi, and the wall thickness for a 70 mm steel tube at S=10,000-12,000 psi is 2.5-3 mm. For molten salt, the wall thickness is driven by bending requirements rather than by bursting pressure because the pressure is very low, but the tube will bend because of high operating temperature—see Table 1).

There are many stainless steels that meet the allowable stress requirement at temperatures of 400 to 500° C.—where HCEs would be used with various HTFs. However, requirements for low welding stress and minimum hydrogen permeability require the use of low carbon steels, so-called L steels. Very few L steels are rated for temperatures above 450° C. because of the rapid degradation of the elastic modulus and yield strength above about 400° C. Nevertheless, potential steel choices include: TP316LN (16Cr-12Ni-2Mo—N) which has an allowable stress of 12,000 psi at 400° C., and 11,000 psi at 500° C.; TP310MoLN (25Cr-22Ni-2Mo—N) which has an allowable stress of 16,000 psi at 400° C., and 15,000 psi at 482° C. (which is the maximum operating temperature for this steel); and TP317L (18Cr-13N-3Mo) which has no data for stress in pipe form, however in plate form the allowable stress and maximum operating temperature are the same as for TP310MoLN.

An allowable stress of 20,000 psi for glass-ceramics is accepted in the art.

The central tube wall thickness is also determined by structural stiffness requirements, which may be estimated using beam bending calculations. Table 1 shows the elastic modulus for stainless steel as a function of temperature used for the conventional tube design, and maximum deflection and stress at the center of the tube. Although numerous glass-ceramic materials with high strength and temperature ratings may be used in accordance with the present invention, for comparison purposes, Corning Inc. Pyroceram® 9606 glass-ceramic was chosen as an example to estimate the required wall thickness to obtain the same deflection at the center of the central tube 102 as that of a stainless steel tube of the prior art. Pyroceram® 9606 glass-ceramic has a maximum operating temperature in long term usage of 680° C., and the reported elastic modulus varies from 92 GPa (used in Table 1) to 122 GPa (which is almost independent of test temperature).

Table 1 shows that glass ceramic tubes made using materials similar to Pyroceram® 9606 glass-ceramic or Schott's Robax® would require a wall thickness of about 3-3.5 mm to ensure structural stiffness comparable to a steel tube at 400-500° C. Table 1 also shows that a glass-ceramic central tube 102 would result in a significantly lower weight compared to a steel tube (see, steel and glass-ceramic tube with 5 mm wall thickness), which enables lower cost tracking systems to be used. This advantage is particularly significant for high pressure direct steam generation, which would require a comparable steel tube with a 4-6 mm wall thickness. As indicated by the "*", at 500° C. the wall thickness of these steel tubes would need be increased to at least 2.5 mm even at low pressure for structural thickness.

TABLE 1

Beam bending calculations. The data assume a full tube of fluid having a density of 1.06 g/cm³ (e.g., Therminol ® VP-1).

| Tube Material | Density g/cm³ | Elastic modulus GPa | OD mm | Wall thickness mm | Tube weight (empty) kg | Tube weight (full) kg | Max deflection mm | Stress in center kPa | Stress in center psi |
|---|---|---|---|---|---|---|---|---|---|
| Stainless Steel 20° C. | 7.85 | 195.0 | 70 | 2 | 13.4 | 27.9 | 4.7 | −1.93E+04 | −2799 |
| Stainless Steel 100° C. | 7.85 | 168.5 | 70 | 2 | 13.4 | 27.9 | 5.5 | −1.93E+04 | −2799 |
| Stainless Steel 500° C.* low pressure HTF | 7.85 | 160.0 | 70 | 2 | 13.4 | 27.9 | 5.8 | −1.93E+04 | −2799 |
| Stainless Steel 500° C.* low pressure HTF | 7.85 | 160.0 | 70 | 2.5 | 16.6 | 30.7 | 5.2 | −1.74E+04 | −2517 |
| Stainless steel, 500° C., ~1500-1800 psi HTF pressure | 7.85 | 160.0 | 70 | 5 | 32.1 | 44.0 | 4.1 | −1.39E+04 | −2012 |
| Pyroceram or Robax | 2.58 | 92.0 | 70 | 2 | 4.4 | 18.9 | 6.8 | −1.31E+04 | −1896 |
| Pyroceram or Robax | 2.58 | 92.0 | 70 | 3.5 | 7.5 | 20.8 | 4.6 | −8.75E+03 | −1269 |
| Pyroceram or Robax | 2.58 | 92.0 | 70 | 5 | 10.5 | 22.5 | 3.7 | −7.09E+03 | −1029 |

In view of the discussion above, the wall thickness of the central tube 106 may be less than or equal to 5 mm thick, such as about 3-3.5 mm thick.

For brittle materials, such as glass-ceramic, slow crack growth is an important parameter when considering life predictions under continuous load. The discussion below relates to the importance of surface finishing in a glass-ceramic central tube 102. Indeed, slow crack growth under constant load is likely the major mode of failure. As no test data were found using a tube geometry, an estimate of time to failure is based on published data on flat samples of glass-ceramic. Samples of glass-ceramic ground with a course 230 to 270 diamond grit and thickness of 6 mm have been reported to have a lifetime of 737,000 years with a constant applied stress of 5.5 MPa (798 psi) with 0.001 probability of failure. Machined samples of Pyroceram® 9606 glass-ceramic and chemically etched (surface strengthened) samples of Pyroceram® 9606 glass-ceramic (each of thickness 2.5 mm) have been tested and reported. The Weibull modulus of the machined samples ranged from 9 to 19 and, as expected for a brittle material with a rough surface, had a wide distribution of crack sizes. The sample with a surface strengthened by chemical etching was reported to have a much higher Weibull modulus of 40-50 because the size distribution of cracks was narrow and the etching process healed the surface. The predicted time to failure due to slow crack growth has been reported using the following equation:

$$t_f = 24.3897 \left( \exp\left( 0.02 \ln\left( \ln\left( \frac{1}{1-F} \right) \right) \right) + 5.7082 \right)^{19.45} \sigma^{-21.45}$$

where F is probability of failure and $\sigma$ is the applied stress. Under the applied stress reported in the study (i.e., a fluid pressure in the pipes of up to 3000 psi or 10 MPa) the time to failure of the glass-ceramic was essentially infinite. The above information is discussed further in Choi, S. R., Gyekenyesi, J. P., "Results of mechanical testing of Pyroceram glass-ceramic," NASA/TM 2003-212487. Numerous other studies of glass-ceramic also support high strength with good and consistent surface finish.

The thermal conductivity of the glass-ceramic central tube 102 is from about 1.5 to 3.5 W/(m-K), which is lower than that of stainless steel (14.6 W/(m-K)). As the wall thickness of the central tube 102 (of glass-ceramic) is only several millimeters, it can be assumed that a steady state temperature is reached rapidly. Thus, lower thermal conductivity of the glass-ceramic may not have a significant impact on heat transfer to the HTF within the tube 102—particularly if a non-transparent glass-ceramic material is used. If a transparent glass-ceramic material is used to form the central tube 102, then the sun radiation spectrum may not be efficiently converted into heat until it reaches the inner wall of the central tube 102, which should result in a very high efficiency of heat transfer.

It is noted that the elimination of the bellows 18 in the present invention significantly reduces the potential surface area for heat loss through a conductive metal part. As a result, the potential heat loss of 10% found in conventional HCE design is eliminated. It should also be noted that the elimination of the bellows 18 in the present invention significantly reduces the cost of the heat collection element.

As discussed in the background section of the instant specification, one of the major concerns with use of some HTFs, such as Therminol® VP-1 is oil degradation and hydrogen diffusion into the vacuum space 106. There is also a concern about hydrogen permeation when steam is used as the HTF. Free hydrogen generated by age degradation of the HTF has to potential of diffusing through the central tube 102 and compromises the vacuum within the cylindrical space 106. The permeation rate increases with increasing operating temperature. Hydrogen gas has very high thermal conductivity so there is a large heat loss associated with any leakage of hydrogen into the space 106 and resultant reduction of vacuum.

Hydrogen diffusivity in steel is lowest for austenitic steel with low carbon and fcc structures. The diffusion constants in 304L and 316 stainless steel at temperatures from 300-600° C. are $2.1 \times 10^{-3}$ cm$^2$/sec and $1.74 \times 10^{-2}$ cm$^2$/sec, respectively, with activation energies of 46 and 52.8 kJ/mol. Permeability of $H_2$ is pressure dependant. In the pressure range estimated for $H_2$ pressure in synthetic HTF of $1 \times 10^{-4}$ to 0.03 MPa, and a temperature range from 373-623 K, permeability of $H_2$ in austenitic alloys is estimated to be $5.35 \times 10^{-5}$ mol $H_2$/(m s MPa$^{1/2}$), with an activation energy of 56.1 kJ/mol. Solubility of $H_2$ stainless steel under those conditions is 266 mol $H_2$/(m s MPa$^{1/2}$).

Glass-ceramic materials are among the best hydrogen barriers. Studies of hydrogen permeation in glass alone have reported diffusion constants on the order of $10^{-7}$ to $10^{-8}$ cm$^2$/sec, about 4-6 orders of magnitude smaller than those of stainless steel. Hydrogen has high solubility in glass which would also limit its permeation out of a glass-ceramic tube. For glass or glass-ceramic material, permeation rate is a product of hydrogen solubility and diffusion constant of hydrogen, while for steel the surface condition plays an important role as well (e.g. an oxidized surface can reduce the permeation by several orders of magnitude compared to a pristine steel surface).

Hydrogen permeation through steel and glass tubes has been studied and reported in the art using equation for $H_2$ permeation through a membrane. The following equations were used for Hydrogen permeation through steel:

$$n_{H2} = Area_{SS} \cdot \Phi(T) \cdot \frac{[(p_{H2,HTF})^{0.5} - (p_{H2,annulus})^{0.5}]}{thickness_{SS}}$$

and for glass ceramics:

$$q_{H2} = Area_{SS} \cdot K(T) \cdot \frac{(p_{H2,HTF} - P_{H2,annulus})}{thickness_{SS}}$$

where $n_{H2}$ is the rate of hydrogen entering the annulus (mol $H_2$/s), $q_{H2}$ is the rate of hydrogen entering annulus (cm$^3$ (STP)/s), $Area_{SS}$ is the surface area of the absorber available for permeation (0.8418 m$^2$ for a 4.06 m long tube with ID=0.066 m), $\Phi(T)$ and $K(T)$ are the permeability rate of the stainless steel and glass, respectively, with units as shown in Table 2 (calculated from Arhenius relationship using permeation rate at absolute temperature, and activation energy), $p_{H2,HTF}$ is the estimated vapor pressure of hydrogen in the HTF, $P_{H2,annulus}$ is the pressure of hydrogen in the annulus ($10^{-4}$ Torr, taken as zero in Table 2), and thickness$_{SS}$ is the wall thickness of the tube. Ideal gas law is used to convert $n_{H2}$ and $q_{H2}$ to units of L-Torr $H_2$/hour.

Table 2 uses a range of permeation rates typical for glasses and glass-ceramics. The permeation in glass-ceramics compared to steel is 50-2500 times lower under the same conditions. Results in Table 2 show that by choosing a glass composition with low permeability to hydrogen it is possible to keep hydrogen partial pressure in the space 106 very low with using very little getter material. For example, the getter material disposed in the volume 106 between the outer tube 104 and the central tube 102 may be well less than 40 grams, such as less than 20 grams, less than 5 grams, particularly about 1 gram. Contrast this with the prior art stainless steel central tube construction, where 40-80 g of getter are used. Since the wall thickness of the glass-ceramic central tube 102 may be at least about 3.5 mm due to the lower modulus of glass-ceramic (Table 1), the permeation rate of $H_2$ in the glass-ceramic tubes would decrease even further.

Additionally, the use of supersaturated steam and molten salts as HTFs are more attractive when a glass-ceramic is used as the central tube 102. Indeed, the concern with using supersaturated steam as an HTF in a steel tube (because of the weight of the steel) is not a big factor with a glass-ceramic.

Figure 5:
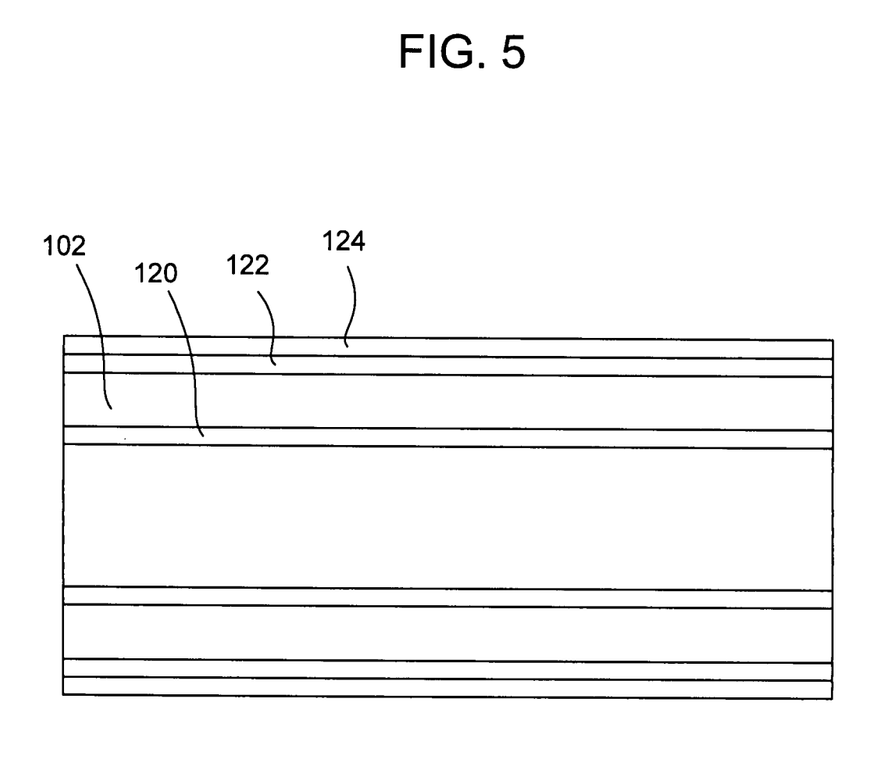
FIG. 5 is a side cross-sectional view of a heat collection element employing a glass-ceramic central tube and selective coatings in accordance with one or more further aspects of the present invention.

Further, the potential for corrosion of the glass-ceramic material with a molten salt HTF is not nearly that as with a steel tube.

outside surface thereof). Contrast this with a steel tube, which requires the coating on the outside surface thereof. The solar energy absorbing coating 120 may be of a dark hue, and

TABLE 2

Top section is for steel and bottom section for glass ceramic

| T (K) | Pressure Mpa | Area (m2) | thickness (m) | Perm rate (mol/m-s-Mpa^0.5) | Activation energy (kJ/mol) | K (T) | mol H2/sec |
|---|---|---|---|---|---|---|---|
| 505 | 1.33E−05 | 0.84 | 0.002 | 5.35E−05 | 56.1 | 8.51E−11 | 1.31E−10 |
| 505 | 1.33E−04 | 0.84 | 0.002 | 5.35E−05 | 56.1 | 8.42E−11 | 4.09E−10 |
| 505 | 1.33E−03 | 0.84 | 0.002 | 5.35E−05 | 56.1 | 8.42E−11 | 1.29E−09 |
| 586 | 1.33E−05 | 0.84 | 0.002 | 5.35E−05 | 56.1 | 5.34E−10 | 8.21E−10 |
| 586 | 1.33E−04 | 0.84 | 0.002 | 5.35E−05 | 56.1 | 5.34E−10 | 2.60E−09 |
| 586 | 1.33E−03 | 0.84 | 0.002 | 5.35E−05 | 56.1 | 5.34E−10 | 8.21E−09 |
| 666 | 1.33E−05 | 0.84 | 0.002 | 5.35E−05 | 56.1 | 2.13E−09 | 3.27E−09 |
| 666 | 1.33E−04 | 0.84 | 0.002 | 5.35E−05 | 56.1 | 2.13E−09 | 1.03E−08 |
| 666 | 1.33E−03 | 0.84 | 0.002 | 5.35E−05 | 56.1 | 2.13E−09 | 3.27E−08 |

| T (K) | pressure (Torr) | L-Torr H2/hour | Hours to fill 1 getter | Hours to fill 80 getters | Hours to fill 24 getters |
|---|---|---|---|---|---|
| 505 | 0.1 | 0.0148 | 6737 | 538987 | 161696 |
| 505 | 1 | 0.0464 | 2155 | 172391 | 51717 |
| 505 | 10 | 0.1467 | 681 | 54515 | 16354 |
| 586 | 0.1 | 0.1080 | 926 | 74097 | 22229 |
| 586 | 1 | 0.3414 | 293 | 23432 | 7029 |
| 586 | 10 | 1.0797 | 93 | 7410 | 2223 |
| 666 | 0.1 | 0.4893 | 204 | 16350 | 4905 |
| 666 | 1 | 1.5473 | 65 | 5170 | 1551 |
| 666 | 10 | 4.8929 | 20 | 1635 | 491 |

| T (K) | Pressure (cm Hg) | Area (cm^2) | Thickness (mm) | Perm rate (sccm-mm/sec-cm2-cmHg) | Activation energy (cal/mole) | K (T) | cm^3 (STP) H2/sec | Pressure (Torr) |
|---|---|---|---|---|---|---|---|---|
| 666.7 | 0.1 | 8418.21 | 2 | 1.00E−07 | 5000 | 2.31E−09 | 9.72E−07 | 1 |
| 666.7 | 0.1 | 8418.21 | 2 | 1.00E−07 | 8000 | 2.41E−10 | 1.01E−07 | 1 |
| 666.7 | 0.1 | 8418.21 | 2 | 5.00E−07 | 5000 | 1.15E−08 | 4.86E−06 | 1 |
| 666.7 | 0.1 | 8418.21 | 2 | 5.00E−07 | 8000 | 1.20E−09 | 5.06E−07 | 1 |
| 666.7 | 0.1 | 8418.21 | 4 | 1.00E−07 | 5000 | 2.31E−09 | 4.86E−07 | 1 |
| 666.7 | 0.1 | 8418.21 | 4 | 1.00E−07 | 8000 | 2.41E−10 | 5.06E−08 | 1 |
| 666.7 | 0.1 | 8418.21 | 4 | 5.00E−07 | 5000 | 1.15E−08 | 2.43E−06 | 1 |
| 666.7 | 0.1 | 8418.21 | 4 | 5.00E−07 | 8000 | 1.20E−09 | 2.53E−07 | 1 |

| T (K) | L-Torr H2/hour | Mol H2/sec | Ratio H2 permeation rate at 1 Torr and 666 K steel/glass ceramic | Hours to fill 1 getter | Hours to fill 80 getters | Hours to fill 24 getters |
|---|---|---|---|---|---|---|
| 666.7 | 0.0059 | 3.9735E−11 | 260 | 16815 | 1345167 | 403550 |
| 666.7 | 0.0006 | 4.2121E−12 | 2454 | 158621 | 12689703 | 3806911 |
| 666.7 | 0.0302 | 2.0207E−10 | 51 | 3306 | 264519 | 79356 |
| 666.7 | 0.0032 | 2.1061E−11 | 491 | 31724 | 2537941 | 761382 |
| 666.7 | 0.0030 | 1.9868E−11 | 520 | 33629 | 2690334 | 807100 |
| 666.7 | 0.0003 | 2.1061E−12 | 4909 | 317243 | 25379407 | 7613822 |
| 666.7 | 0.0151 | 1.0103E−10 | 102 | 6613 | 529039 | 158712 |
| 666.7 | 0.0016 | 1.053E−11 | 982 | 63449 | 5075881 | 1522764 |

The central tube 106 of the HCE 100 may have a selective coating that: (i) absorbs sun radiation (preferably peaked in a visible part of the frequency spectrum, extending up to about 2 um); (ii) reflects infrared radiation; and (iii) has low emissivity (<0.1, preferably <0.07 at 400-500° C.). Unlike the coatings of the prior art, the coatings on the glass-ceramic need not be specifically directed to use as a hydrogen barrier—although the coatings may have some hydrogen barrier properties.

With reference to FIG. 5, the central tube 102 may be of at least partially transparent construction (and may be significantly transparent). A solar energy absorbing coating 120 may be disposed on an inside surface thereof (not on the outside surface thereof). Contrast this with a steel tube, which requires the coating on the outside surface thereof. The solar energy absorbing coating 120 may be of a dark hue, and applied via lamination, sol-gel processing, and/or other suitable techniques in the art. The solar energy absorbing coating 120 may exhibit a peak absorption in the visible light spectrum of wavelengths of about 2 um or less. The structure may alternatively or additionally include an infrared mirror coating 122 on an outside surface of the central tube. In this example, the infrared mirror coating 122 is applied to the outside surface of the central tube 102 itself. A further anti-reflective coating 124 (e.g., ¼ λ $SiO_2$ or $Al_2O_3$) may overlie the infrared mirror coating 122.

Figure 6:
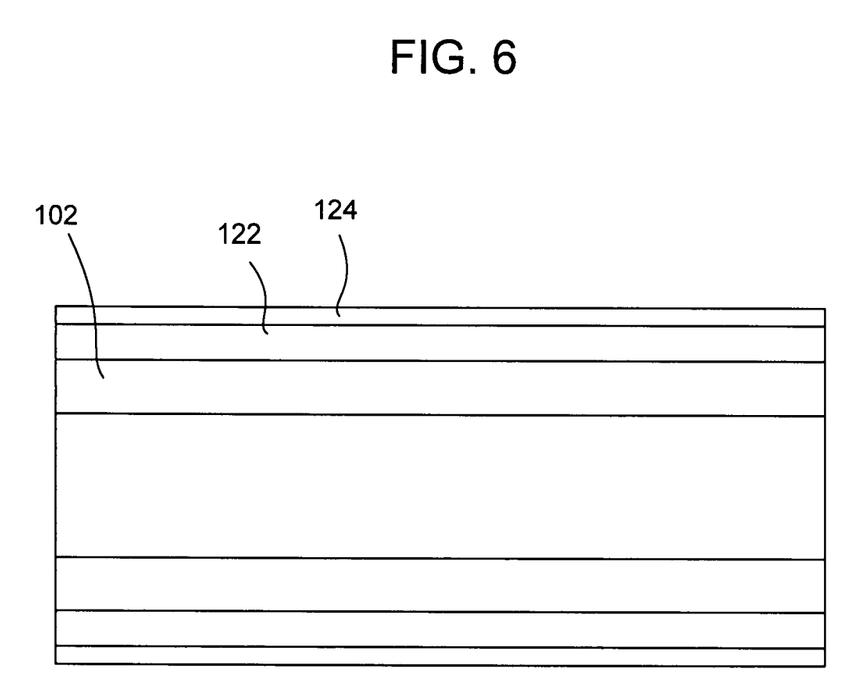
FIG. 6 is a side cross-sectional view of an alternative design of a heat collection element employing a glass-ceramic central tube and selective coatings in accordance with one or more further aspects of the present invention.

In an alternative embodiment shown in FIG. 6, the central tube 102 may be formed from a glass-ceramic having a dark opaque pigment. The structure may include an infrared mirror coating 122 on an outside surface of the central tube 102. As the glass-ceramic material is dark, there is no need for any solar energy absorbing coating 120 disposed on an outside surface thereof. A further anti-reflective coating 124 (e.g., ¼ λ $SiO_2$ or $Al_2O_3$) may overlie the infrared mirror coating 122.

Figure 7:
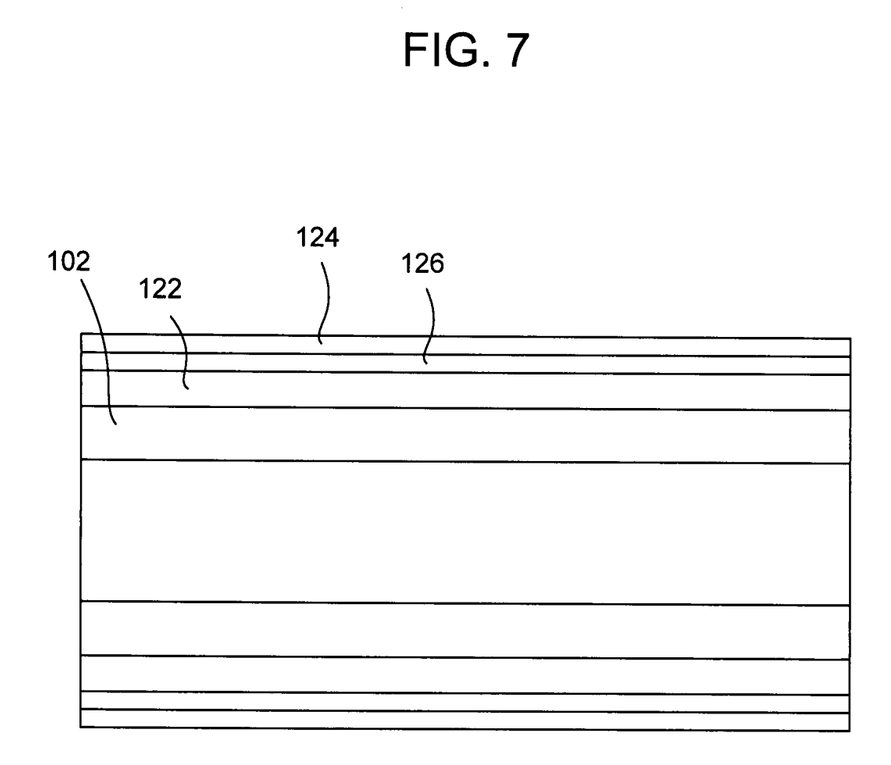
FIG. 7 is a side cross-sectional view of a further alternative design of a heat collection element employing a glass-ceramic central tube and selective coatings in accordance with one or more further aspects of the present invention.

In an alternative embodiment shown in FIG. 7, the central tube 102 may be formed from a glass-ceramic having a light opaque pigment. The infrared mirror coating 122 may be applied to the outside surface of the central tube 102. A solar energy absorbing coating 126 (e.g., cermet, 70-100 nm Mo—$Al_2O_3$) may be disposed on the layer 122. A further anti-reflective coating 124 (e.g., ¼ λ $SiO_2$ or $Al_2O_3$) may overlie the solar energy absorbing coating 126.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A solar heat collection element, comprising:
   a central tube formed from glass-ceramic material; and
   an outer tube formed from glass material disposed coaxially with respect to the central tube to form a volume therebetween,
   wherein respective ends of the outer tube are directly fused to the central tube with a glass to ceramic seal, and
   wherein an operating temperature range of the outer tube is lower than an operating temperature range of the central tube, and a coefficient of thermal expansion (CTE) of the outer tube is greater than a CTE of the central tube such that longitudinal expansions of the outer tube and the central tube over the respective operating temperature ranges of the outer tube and the central tube substantially match one another.

2. The solar heat collection element of claim 1, further comprising steel metal collars fused to opposite ends of the central tube, wherein the steel metal collars are operable to permit welding of the solar heat collection element to an adjacent solar heat collection element.

3. The solar heat collection element of claim 1, wherein the CTE of the outer tube is between about 2 to 6 times greater than the CTE of the central tube.

4. The solar heat collection element of claim 1, wherein the CTE of the central tube is less than about 4 ppm/° C.

5. The solar heat collection element of claim 1, further comprising a getter material disposed in the volume between the outer tube and the central tube.

6. The solar heat collection element of claim 5, wherein one of:
   the getter material is less than 40 grams;
   the getter material is less than 20 grams;
   the getter material is less than 5 grams; and
   the getter material is about 1 gram.

7. The solar heat collection element of claim 1, wherein the central tube is at least partially transparent and includes a solar energy absorbing coating on an inside surface thereof, the solar energy absorbing coating exhibiting a peak absorption in a visible light spectrum of wavelengths of about 2 um or less.

8. The solar heat collection element of claim 7, further comprising:
   an infrared mirror coating on an outside surface of the central tube; and
   an anti-reflective coating on the infrared mirror coating.

9. The solar heat collection element of claim 1, wherein:
   the central tube is of a dark opaque pigment; and
   the central tube does not include a solar energy absorbing coating on an outside surface thereof.

10. The solar heat collection element of claim 9, further comprising:
    an infrared mirror coating on an outside surface of the central tube; and
    an anti-reflective coating on the infrared mirror coating.

11. The solar heat collection element of claim 1, further comprising an infrared mirror coating on an outside surface of the central tube.

12. The solar heat collection element of claim 11, further comprising a solar energy absorbing coating on the infrared mirror coating.

13. The solar heat collection element of claim 12, further comprising an anti-reflective coating on the solar energy absorbing coating.

14. The solar heat collection element of claim 1, wherein one of:
    a wall thickness of the central tube is less than 5 mm thick;
    a wall thickness of the central tube is less than 4 mm thick; and
    a wall thickness of the central tube is between about 3-3.5 mm thick.

15. The solar heat collection element of claim 1,
    wherein the central tube is at least partially transparent and comprises a solar energy absorbing coating on an inside surface of the central tube, an infrared mirror coating on an outside surface of the central tube, and an anti-reflective coating on the infrared mirror coating.

16. The solar heat collection element of claim 15, further comprising a getter material disposed in the volume between the outer tube and the central tube, wherein the getter material is between about 1-5 grams.

17. The solar heat collection element of claim 15, wherein a wall thickness of the central tube is between about 3-3.5 mm.

* * * * *